United States Patent

Otsuka

[15] 3,658,466
[45] Apr. 25, 1972

[54] PROCESS FOR THE SEPARATION OF ZIRCONIUM AND HAFNIUM

[72] Inventor: Takeshi Otsuka, Tokyo, Japan
[73] Assignee: Nippon Mining Co., Ltd., Tokyo, Japan
[22] Filed: Aug. 15, 1968
[21] Appl. No.: 752,754

[30] Foreign Application Priority Data

Aug. 16, 1967 Japan..............................42/52248
Aug. 16, 1967 Japan..............................42/52249
Aug. 16, 1967 Japan..............................42/52250

[52] U.S. Cl..........................................23/22, 22/23, 22/24, 22/61
[51] Int. Cl................C22b 59/00, C01g 25/00, C01g 27/00
[58] Field of Search.................................23/18–20, 22, 23, 23/24, 24.1, 61

[56] References Cited

UNITED STATES PATENTS 2,877,250  3/1959  Brown et al. .....................23/22 UX
3,395,976  8/1968  Glemsen et al. ....................23/23 X

OTHER PUBLICATIONS

Coleman et al., " Industrial and Engineering Chemistry," Vol. 50, 1958, pp. 1757– 1762.
Sinegribova et al., " Atomic Energy Reviews," Vol. 4, 1966, pp. 93– 106 (pp. 93, 94, 96 & 97 relied upon).

Primary Examiner—Herbert T. Carter
Attorney—Robert E. Burns and Emmanuel J. Lobato

[57] ABSTRACT

The separation of zirconium and hafnium is carried out by contacting countercurrently a kerosene solution of a water insoluble tertiary amine and a monohydroxyl alcohol having a dielectric constant of less than 15 with an acidified aqueous solution of zirconium and hafnium containing sulfate ion whereby substantially all of the zirconium contained in the aqueous solution is extracted preferentially into the kerosene solution and then back-extracting the kerosene solution thus loaded with zirconium and also containing a small amount of hafnium is then extracted with a dilute aqueous sulfuric acid to solution to remove the hafnium from the kerosene solution. Zirconium is recovered by contacting the kerosene solution with an aqueous solution containing carbonate.

10 Claims, No Drawings

PROCESS FOR THE SEPARATION OF ZIRCONIUM AND HAFNIUM

BACKGROUND OF THE INVENTION

The present invention relates to a process for the separation of zirconium and hafnium from a zirconium salt containing hafnium. In particular, the present invention concerns a method of countercurrent liquid-liquid extraction of zirconium and hafnium from zirconium containing hafnium to produce high purity zirconium.

Zirconium, due to its corrosion resistance and low absorption of neutrons is a desirable material for reactors. For such use, zirconium must be free of hafnium, which is present in most zirconium ores, and which is rather difficult to separate from zirconium.

While many procedures have been devised in an attempt to separate zirconium and hafnium, the procedures now in use tend to be expensive and also complicated.

The only conventional liquid-liquid separation process in practical use at the present time for separating zirconium and hafnium is the hexone extraction process. In the hexone extraction process, hafnium is preferentially extracted from zirconium and hafnium thiocyanate by means of methyl isobutyl ketone or hexone. This extraction process, known as the MIBK process has several shortcomings and disadvantages. The MIBK process consumes a great amount of chemicals and requires complicated equipment. In addition, the operations involved are troublesome and the corrosion problems are great. In view of these drawbacks, this process has been far from satisfactory from both technical and economic points of view.

SUMMARY OF THE INVENTION

The principal object of the present invention is to provide a process by means of which zirconium and hafnium are produced in high purity for reactors.

Another object of the present invention is the provision of a particularly economical and simple process for producing zirconium and hafnium in high purity from a zirconium salt containing hafnium.

A specific object of the present invention resides in the separation of zirconium and hafnium from a mixture thereof by means of liquid-liquid countercurrent extraction.

Another object of the present invention is to provide a process in which a water soluble zirconium compound of high purity is obtained, by means of a process which is more economical than the conventional process.

A still further object of the present invention is to provide a particularly economical process to obtain zirconium in high purity wherein the organic solvents and compounds used therein i.e., the organic phase may be conveniently regenerated and recycled.

According to the present invention, zirconium and hafnium are separated by contacting countercurrently a kerosene solution of a water insoluble tertiary amine and a monohydroxyl alcohol having a dielectric constant of less than 15 with an acidified aqueous solution of zirconium and hafnium containing sulfate ion whereby the zirconium is extracted preferentially into the kerosene solution. In order to obtain highly pure zirconium, the thus obtained kerosene solution is then further contacted countercurrently with a dilute sulfuric acid solution to remove trace amounts of hafnium into the dilute sulfuric acid solution from the kerosene solution.

DESCRIPTION OF THE PREFERRED EMBODIMENTS

In the present process, native zirconium or any zirconium salt containing hafnium is dissolved in aqueous solution which contains sulfuric acid. The initial sulfuric acid solution of zirconium and hafnium may contain up to about 0.5 mols of zirconium. A zirconium concentration of at least about 0.1 mol has been found desirable from an economic point of view with respect to the quantity of solutions involved, however, considerably more dilute solutions may be used if desired. The preferred concentration of sulfuric acid in the initial aqueous solution of zirconium and hafnium is about 0.5 to 2 mols.

The kerosene solution which has been found to extract zirconium preferentially contains 5 to 20 per cent by volume of a water insoluble tertiary amine and 1 to 10 percent by volume of a water insoluble monohydroxyl alcohol having a dielectric constant of less than 15° at 20° C.. Any water insoluble tertiary amine can be used in the present process; such amines generally have high molecular weight of the order of about 250 to 700. It has been found that tri-n-octyl amine, tri-isooctyl amine and mixtures thereof are particularly desirable in the present process, however, other high molecular weight tertiary amines such as tridecyl amine and tertiary amines containing from about 15 to 50 carbon atoms may be used in the present process.

According to the present process, an aqueous solution containing free sulfuric acid, zirconium sulfate and hafnium sulfate is contacted countercurrently with kerosene containing a water insoluble tertiary amine and a water insoluble mono-hydroxyl alcohol having a dielectric constant of less than 15 at 20° C., using a multistage countercurrent extractor. The ratio of the volume of aqueous solution to kerosene solution as well as the preferred number of extraction stages varies with the particular concentration of solution and the degree of purity desired. For example, when using an aqueous solution containing a zirconium concentration of 0.1 mol and a kerosene solution containing 10 per cent by volume of tri-octyl amine, equivalent to about 0.1 mol of amine, the ratio of aqueous solution to kerosene solution by volume is about 1:2. Under these conditions, a countercurrent extractor containing about 8 theoretical plates results in the preferential extraction of zirconium into the organic solvent and the concentration of hafnium in the aqueous solution.

One of the most remarkable and important characteristics of the process of the present invention is that zirconium of exceedingly high purity may be obtained by carrying out the process in two steps; that is, using an extraction step and a back extraction step.

Thus, in accordance with the present invention, after carrying out the extraction step as described above, the kerosene solution from the extraction step loaded with zirconium is contacted with a dilute sulfuric acid solution, in order to remove completely, trace amounts of hafnium coexisting with zirconium in the organic solvent into the dilute sulfuric acid solution. The concentration of sulfuric acid used in the back extraction step is of the order of 0.5 to 2.5 mols and a multistage countercurrent extractor is also employed for this part of the process. It is generally unavoidable to extract a small amount of zirconium together with the hafnium into the aqueous solution in this step of the process.

In the present process, no special equipment is required and any ordinary multistage countercurrent liquid-liquid extractors may be employed. As is usual with such processes, the number of theoretical stages may vary over a wide range depending on the concentrations of the individual solutions and the degree of purity of the final product ultimately desired. For example, in the present process multistage extractors containing about six to 10 theoretical plates are employed conveniently, and in the back extracting step, extractors containing about 10 extraction plates have been found to be highly effective.

By carrying out the two step extraction, an initial extraction step and a back extraction step, substantially all of the hafnium is removed from the organic solvent and the zirconium in the organic solvent is substantially totally free of hafnium. The dilute sulfuric acid solution of hafnium obtained after completion of the back extraction step which contains a small amount of zirconium, as mentioned above is recycled into the extraction step.

By combining these two steps, in accordance with the present invention a zirconium product containing less than 0.01 per cent by weight of hafnium and also a hafnium product containing less than 4 per cent by weight of zirconium are obtained respectively.

Zirconium free of hafnium, present in the organic solvent as a result of the combined steps of extraction and back extraction may then be separated from the organic solvent. This is accomplished by contacting the organic solvent containing zirconium with an aqueous solution of a carbonate salt. This results in the conversion of zirconium into a water soluble form so that it separates from the organic solvent and is extracted into the aqueous solution. At the same time, the amine in the organic solvent is regenerated to the free form. The organic solvent is then separated from the zirconium carbonate solution, and since the amine in the organic solvent has been converted to its initial free form, the kerosene solution is ready to be reused in the initial extraction and may be recycled to the initial extraction step. Thus, by contacting the kerosene solution with an aqueous solution of a carbonate salt, zirconium of high purity and in water soluble form in separated and simultaneously the kerosene solution is regenerated.

of the additive alcohol must be less than 15 in the process of the present invention.

Table 2 shows the results of neutralization of the organic phase by various amounts of carbonate salt solution. According to the table, if the pH value of the aqueous phase posterior to neutralization is above about six, the dielectric constant of the organic solvent becomes about 2.15. This value is substantially the same as that of the fresh organic solvent in the process of the present invention. Thus it has been found that the regeneration of the organic solvent may be effected successfully solely by controlling the volume ratio between the organic phase and the carbonate salt solution, so that pH value of the aqueous phase posterior to the neutralization of the organic phase is about six. However, separation of the two liquid phases tends to be slow if the pH value is not about 7.5. Thus it has been found that it is essential that the final pH value of the aqueous phase, posterior to the neutralization of the organic solvent, be controlled at about 7.5 or higher.

TABLE 2

| Experiment No.: | Volume of organic solvent prior to neutralization in liters | Volume of sodium carbonate in liters | pH of aqueous solution after neutralization | Dielectric constant of organic solution after neutralization | Recovery ratio of zirconuum as zirconium oxide | Remarks |
| --- | --- | --- | --- | --- | --- | --- |
| 1 | 10 | 1 | ¹5 | 2,474 | 68.4 | Emulsion forming. |
| 2 | 10 | 2 | 6.3 | 2.151 | 97.5 | Do. |
| 3 | 10 | 3 | 7.5 | 2.155 | 99.9 | Rapid separation of two liquid phases. |
| 4 | 10 | 4 | 9.0 | 2.158 | 100.2 | Do. |
| 5 | 10 | 5 | 9.5 | 2.164 | 99.4 | Do. |
| Fresh organic solvent | | | | 2.155 | | |

¹ Or less.

Any water soluble carbonate salt, such as ammonium carbonate and the alkali metal carbonates may be used in the final step of the present method.

It has been found that the addition of a water insoluble monohydroxyl alcohol having a dielectric constant of less than 15 at 20° C. to the kerosene solution aids the separation of the two liquid phases in the present countercurrent extraction.

Table 1 shows the effect of various amounts of water insoluble monohydroxyl alcohols contained in a kerosene solution of tri-n-octyl amine wherein the kerosene solution is contacted with an aqueous solution of 1 mol of sulfuric acid and about 0.25 mol of zirconium tetrachloride and hafnium tetrachloride in native ratio, at a liquid volume ratio of 5 to 1 at 20° C.

Thus, it has been found, as shown in Table 1, that if 1 to 10 per cent by volume of water insoluble monohydroxyl alcohol is contained in the organic solvent, separation of the two liquid phases is effected within 2 minutes and no emulsion occurs; if more than 10 volume per cent of the alcohol is present, distribution of zirconium into the organic phase is reduced. Thus, the preferred amount of the alcohol in the kerosene solution is of the order of 1 to 10 per cent by volume. It has also been found that if the dielectric constant of the added alcohol is 15 or higher than 15, its solubility loss into the aqueous solution is promoted, accordingly, the dielectric constant

EXAMPLES

The following examples are set forth for the purposes of illustrating the best modes contemplated for carrying out the present invention but they must not be construed as limiting the invention in any manner whatsoever.

EXAMPLE 1

An aqueous solution containing 0.6 mole of sulfuric acid and 0.1 mole of zirconium tetrachloride containing hafnium tetrachloride in native ratio is contacted with kerosene containing 10 volume percent of tri-n-octyl amine and 3 volume percent of tridecanol, using 9 stage mixer-settler extractors under the volume ratio of 1 to 2 at room temperatures. Zirconium thus extracted in the organic phase is of the purity of 99.93 percent as $ZrO_2/(Zr+Hf)O_2$. And then the organic solution from the extraction stage is introduced into 9 stage countercurrent extractors and contacted with 0.6 mole of sulfuric acid solution to remove the trace amount of hafnium coexisting with zirconium in the organic solvent. In this way, zirconium in the organic solvent after back extraction step is purified to 99.997 percent as $ZrO_2/(Zr + Hf)O_2$.

TABLE 1

| Experiment No. | Kind of alcohol | Dielectric constant of alcohol at 20° C. | Volume percent of alcohol in organic solvent | Separation time of two liquid phases (M & S) | Remarks |
| --- | --- | --- | --- | --- | --- |
| 1 | None | | 0 | 3'~5' | Emulsion forming. |
| 2 | n-Butyl alcohol | 17.1 | 5 | 0'59" | Large solubility loss of alcohol into aqueous phase. |
| 3 | n-Amyl alcohol | 13.9 | 5 | 1'40" | Rapid separation of two phases. |
| 4 | Iso-amyl alcohol | 14.7 | 0.5 | 2'58" | Emulsion forming. |
| 5 | do | 14.7 | 1 | 1'28" | Rapid separation of two phases. |
| 6 | do | 14.7 | 5 | 1'17" | Do. |
| 7 | do | 14.7 | 10 | 1'12" | Do. |
| 8 | do | 14.7 | 15 | 1'22" | Rapid separation reduced distribution coefficient of zirconium. |
| 9 | 2-octyl alcohol | 8.2 | 5 | 2'03" | Rapid separation of two phases. |
| 10 | Tri-decyl alcohol | 4.9 | 0.5 | 3'15" | Emulsion forming. |
| 11 | do | 4.9 | 1 | 1'32" | Rapid separation of two phases. |
| 12 | do | 4.9 | 7.5 | 1'30" | Do. |
| 13 | do | 4.9 | 7.5 | 1'45" | Do. |
| 14 | do | 4.9 | 10 | 1'30" | Do. |
| 15 | do | 4.9 | 20 | 1'05" | Rapid separation reduced distribution coefficient of zirconium |

EXAMPLE 2

An aqueous solution containing 1.5 mole of sulfuric acid and 0.2 mol of zirconium sulfate containing hafnium sulfate in native ratio is contacted with kerosene containing 10 volume percent of tri-iso-octyl amine and 5 volume percent of isoamyl alcohol, using 9 stage mixer-settler extractors under a volume ratio of 1 to 4 at room temperature, zirconium thus extracted into the organic solvent from the extraction stage is of the purity of 99.85 percent as $ZrO_2/(Zr + Hf)O_2$. Then the organic solvent from the extraction stage is introduced into another 9 stage mixer-settler extractor and contacted with 1.8 mol of dilute sulfuric acid solution to remove the trace amount of hafnium coexisting with zirconium in the organic solvent. In this way, zirconium in the organic solvent after the back extraction stage is purified to 99.995 percent as $ZrO_2/(Zr + Hf)O_2$.

EXAMPLE 3

An aqueous solution containing 0.8 mol of sulfuric acid and 0.1 mol of zirconium sulfate containing hafnium sulfate in native ratio is contacted with kerosene containing 10 volume percent of a mixture of tri-n-octyl amine and tri-iso-octyl amine of volume ratio of 1 to 1 and 5 volume percent of tri-decanol, using 9 stage mixer-settler extractors, under a volume ratio of 1 to 2 at 20° C; zirconium thus extracted into the organic solvent from the extraction stage is of the purity of (99.85) percent as $ZrO_2/(Zr + Hf)O_2$.

Then the organic solvent from the extraction stage is introduced into another 9 stage mixer-settler extractor and is contacted with 1.0 mol of dilute sulfuric acid solution to remove trace amount of hafnium coexisting with zirconium in the organic solvent. In this way, zirconium in the organic solvent of the back extraction stage is purified to 99.997 percent as $ZrO_2/(Zr + Hf)O_2$.

EXAMPLE 4

The organic phase obtained in Example 1 containing zirconium and free from hafnium is contacted with 1 mol of sodium carbonate solution at a volume ratio of 2 to 1, thereupon almost 100 percent of zirconium in the organic phase is translated into the aqueous phase, and its concentration in the aqueous phase amounts to 119.5 mg./10ml. as zirconium oxide. Thus the organic phase is freed of zirconium and is ready for recycling to the extraction stage.

EXAMPLE 5

The organic phase obtained in Example 2 containing zirconium and free from hafnium is contacted with 1 mol of sodium carbonate solution at a volume ratio of 3 to 1, thereupon almost 100 percent of zirconium in the organic phase is translated into the aqueous phase, and its concentration in the aqueous phase amounts to 150.0 mg./10ml. as zirconium oxide. Thus the organic phase is freed of zirconium and is ready for recycling to the extraction stage.

EXAMPLE 6

The organic phase obtained in Example 3 containing zirconium and free from hafnium is contacted with 1 mol of ammonium carbonate solution under volume ratio of 3 to 1, thereupon almost 100 percent of zirconium in the organic phase is translated into the aqueous phase, and its concentration in the aqueous phase amounts to 148.0 mg./10ml. as zirconium oxide. Thus organic phase becomes zirconium free and is ready for recycling to the extraction stage.

While the present process has been exemplified by the use of native zirconium, which ordinarily contains up to about 2 per cent by weight of hafnium, it is apparent that the present process may be applied to any mixture of zirconium and hafnium. It is also apparent to one skilled in the art that zirconium and hafnium in ratios and concentrations varying from those illustrated may be separated according to the present invention and that liquid-liquid extractors having fewer theoretical plates may be used in the present process particularly if zirconium with less stringent purity requirements is desired; and likewise, extractors having many more theoretical plates than those employed in the illustrated examples of the present disclosure may also be used. All such modifications are within the skill of the art and may be employed without departing from the scope and spirit of the present invention.

What we claim and desire to secure by Letters Patent is:

1. A process for the separation of zirconium from hafnium by repeated liquid-liquid solvent extraction which comprises dissolving native zirconium or a zirconium salt containing hafnium in an aqueous sulfuric acid solution to form an aqueous solution consisting essentially of about 0.1 to 0.5 mols of said zirconium and about 0.5 to 2.0 mols of sulfuric acid, repeatedly contacting said aqueous solution countercurrently with an organic solution which consists essentially by volume of 70–94 percent of kerosene, 5–20 percent of a water insoluble tertiary amine and 1–10 percent of a water insoluble monohydroxyl alcohol having a dielectric constant of less than 15 whereby zirconium and a small amount of hafnium are extracted into the organic solution, separating the resulting organic solution loaded with zirconium and a small amount of hafnium from the aqueous solution, then back-extracting the zirconium loaded organic solution by multistage countercurrent extraction with an aqueous solution containing 0.5–2.5 mols of sulfuric acid to remove the small amount of hafnium contained in the organic solution, separating the resulting zirconium loaded organic solution thus free of hafnium from the aqueous solution and recovering hafnium-free zirconium from the organic solution by contacting the said organic solution with an aqueous solution containing carbonate salt selected from alkali metal and ammonium carbonates.

2. A process according to claim 1 in which said amine is selected from a member of the group which consists of tri-n-octyl amine, tri-isoóctyl amine and mixtures thereof.

3. A process according to claim 1 wherein the zirconium containing hafnium is zirconium sulfate or zirconium chloride.

4. A process according to claim 1 in which said aqueous solution of carbonate salt is contacted with said organic solution in a volume ratio such that the pH of resulting aqueous phase is at least 7.5, thus recovering zirconium as a water soluble salt and regenerating the kerosene solution containing said amine and said alcohol.

5. A process for the separation of zirconium from hafnium by repeated liquid-liquid solvent extraction, said zirconium containing hafnium and being native zirconium, zirconium chloride or zirconium sulfate, which comprises
   distributing said zirconium between
   1. an inorganic phase consisting essentially of an aqueous solution of about 0.1–0.5 mol of said zirconium containing hafnium and about 0.5–2.0 mol sulfuric acid and
   2. an organic phase consisting essentially of 70–94 volume percent of kerosene, 5–20 volume percent of an amine selected from tri-n-octyl amine, tri-isoctyl amine and mixtures thereof and 1–10 volume percent of at least one primary alcohol which has a dielectric constant of less than 15, whereby zirconium and a small amount of hafnium are extracted into the organic phase,
   separating the resulting organic phase loaded with zirconium and a small amount of hafnium from the inorganic phase,
   then back-extracting the zirconium loaded organic phase by multistage countercurrent extraction with an aqueous phase containing 0.5–2.5 mols of sulfuric acid to remove the small amount of hafnium contained in the organic phase,
   separating the resulting zirconium loaded organic phase thus free of hafnium from the aqueous phase and
   recovering hafnium-free zirconium from the organic phase by contacting said organic phase with an aqueous solution containing carbonate salt selected from alkali metal and ammonium carbonates.

6. The process of claim 5 wherein the organic phase consists essentially of 70–90 volume percent of kerosene, 5–20 volume percent of tri-iso-octyl amine and 1–10 volume percent of said alcohol.

7. The process of claim 5, wherein the organic phase consists of 70–94 volume percent of kerosene, 5–20 volume percent of tri-n-octyl and tri-isoctyl amine mixture and 1–10 volume percent of said alcohol.

8. The process of claim 5 wherein the inorganic phase consists essentially of an aqueous solution of 0.1–0.5 mol of zirconium chloride containing hafnium and 0.5–2.0 mols of sulfuric acid.

9. The process of claim 5, wherein the aqueous solution for recovering zirconium from the hafnium-free zirconium loaded organic phase contains sodium carbonate.

10. The process of claim 5 wherein the inorganic phase consists essentially of an aqueous solution of 0.1–0.5 mol of zirconium sulfate containing hafnium and 0.5 to 2.0 mols of sulfuric acid.

* * * * *